US012591931B2

(12) United States Patent
Creamer

(10) Patent No.: US 12,591,931 B2
(45) Date of Patent: Mar. 31, 2026

(54) METHODS, APPARATUS, AND SYSTEMS TO FACILITATE TRADES USING DISPLAYED FINANCIAL CURVES

(71) Applicant: Geneva Technologies, LLC, Chicago, IL (US)

(72) Inventor: Robert S. Creamer, Chicago, IL (US)

(73) Assignee: Geneva Technologies, LLC, Chicago, IL (US)

( * ) Notice: Subject to any disclaimer, the term of this patent is extended or adjusted under 35 U.S.C. 154(b) by 113 days.

(21) Appl. No.: 18/513,149

(22) Filed: Nov. 17, 2023

(65) Prior Publication Data

US 2024/0087034 A1 Mar. 14, 2024

Related U.S. Application Data

(63) Continuation of application No. 17/720,960, filed on Apr. 14, 2022, now Pat. No. 11,861,714, which is a continuation of application No. 17/160,180, filed on Jan. 27, 2021, now Pat. No. 11,308,560, which is a continuation of application No. 16/273,084, filed on Feb. 11, 2019, now Pat. No. 10,909,626, which is a continuation of application No. 14/537,804, filed on Nov. 10, 2014, now Pat. No. 10,204,379.

(51) Int. Cl.
G06Q 40/06 (2012.01)
G06Q 40/04 (2012.01)

(52) U.S. Cl.
CPC ............. G06Q 40/06 (2013.01); G06Q 40/04 (2013.01)

(58) Field of Classification Search
CPC .............................. G06Q 40/06; G06Q 40/04
See application file for complete search history.

(56) References Cited

U.S. PATENT DOCUMENTS

| | | | |
|---|---|---|---|
| 6,766,207 B2 | 7/2004 | Sato et al. | |
| 6,766,304 B2 | 7/2004 | Kemp et al. | |
| 6,772,122 B2 | 8/2004 | Jowitt et al. | |
| 6,772,132 B1 | 8/2004 | Kemp et al. | |

(Continued)

FOREIGN PATENT DOCUMENTS

| | | |
|---|---|---|
| EP | 1904966 | 4/2008 |
| GB | 2395819 | 6/2004 |

(Continued)

OTHER PUBLICATIONS

Roberts, Pasha "Information Visualization for Stock Market Ticks: Toward a New Trading Interface" (Year: 2004).*

(Continued)

*Primary Examiner* — James H Miller
(74) *Attorney, Agent, or Firm* — Perkins Coie LLP

(57) ABSTRACT

The described technology displays, at a GUI, a graph of one or more financial curves having one or more actionable indicators indicative of one or more tradable events associated with modeling and/or trading at least one market asset or financial instrument at a financial marketplace. The one or more indicators display a current real-time market value of a tradable event associated with the market asset or financial instrument. Input is received at the GUI from a trader to perform an action associated with the financial curve. In response to receiving the input, the action is initiated and the results are displayed at the GUI.

18 Claims, 6 Drawing Sheets

(56) References Cited

U.S. PATENT DOCUMENTS

| | | | |
|---|---|---|---|
| 7,020,629 B1* | 3/2006 | Kihn | G06Q 20/40 |
| | | | 705/37 |
| 7,107,226 B1 | 9/2006 | Cassidy et al. | |
| 7,113,924 B2 | 9/2006 | Fishbain | |
| 7,117,182 B2 | 10/2006 | Chess et al. | |
| 7,127,424 B2 | 10/2006 | Kemp et al. | |
| 7,212,999 B2 | 5/2007 | Friesen et al. | |
| 7,228,289 B2 | 6/2007 | Brumfield et al. | |
| 7,389,258 B2 | 6/2008 | Brumfield et al. | |
| 7,412,416 B2 | 8/2008 | Friesen et al. | |
| 7,418,422 B2 | 8/2008 | Burns | |
| 7,533,056 B2 | 5/2009 | Friesen et al. | |
| 7,571,134 B1* | 8/2009 | Burns | G06Q 40/04 |
| | | | 705/37 |
| 7,630,986 B1 | 12/2009 | Herz et al. | |
| 7,685,024 B2 | 3/2010 | Ofer et al. | |
| 7,870,059 B2 | 1/2011 | Shapiro et al. | |
| 7,890,396 B2* | 2/2011 | Weinstein | G06Q 40/06 |
| | | | 705/37 |
| 8,170,940 B2 | 5/2012 | Tully | |
| 8,175,955 B2 | 5/2012 | Friesen et al. | |
| 8,190,501 B2 | 5/2012 | Kemp et al. | |
| 8,296,221 B1 | 10/2012 | Waelbroeck | |
| 9,600,843 B2 | 3/2017 | Creamer et al. | |
| 10,204,379 B2 | 2/2019 | Creamer | |
| 10,607,290 B2 | 3/2020 | Creamer et al. | |
| 10,909,626 B2 | 2/2021 | Creamer | |
| 10,922,753 B2 | 2/2021 | Creamer et al. | |
| 11,263,603 B1 | 3/2022 | Dhodapkar | |
| 11,308,560 B2 | 4/2022 | Creamer | |
| 11,373,244 B2 | 6/2022 | Nadler | |
| 2002/0143690 A1 | 10/2002 | Mahajan et al. | |
| 2002/0152150 A1* | 10/2002 | Cooper | G06Q 40/06 |
| | | | 705/36 R |
| 2003/0033212 A1 | 2/2003 | Sandhu | |
| 2003/0055664 A1 | 3/2003 | Suri | |
| 2003/0088495 A1 | 5/2003 | Gilbert et al. | |
| 2004/0073496 A1 | 4/2004 | Cohen | |
| 2005/0027622 A1 | 2/2005 | Walker et al. | |
| 2005/0149429 A1* | 7/2005 | Kemp, II | G06Q 40/00 |
| | | | 705/37 |
| 2006/0106707 A1 | 5/2006 | Shetty et al. | |
| 2007/0083452 A1 | 4/2007 | Mayle | |
| 2007/0111777 A1 | 5/2007 | Amaitis et al. | |
| 2007/0179876 A1 | 8/2007 | Stark | |
| 2007/0265954 A1 | 11/2007 | Mather | |
| 2008/0177994 A1 | 7/2008 | Mayer | |
| 2008/0183639 A1 | 7/2008 | DiSalvo | |
| 2008/0249956 A1 | 10/2008 | Connors | |
| 2008/0288889 A1 | 11/2008 | Hunt | |
| 2009/0006226 A1* | 1/2009 | Crowder | G06Q 40/12 |
| | | | 705/30 |
| 2009/0043664 A1 | 2/2009 | Lutnick et al. | |
| 2009/0177543 A1 | 7/2009 | Ram et al. | |
| 2009/0234710 A1 | 9/2009 | Belgaied et al. | |
| 2009/0271332 A1* | 10/2009 | Lo | G06Q 40/04 |
| | | | 705/37 |
| 2010/0049535 A1 | 2/2010 | Chari et al. | |
| 2010/0057627 A1 | 3/2010 | Lutnick | |
| 2010/0198661 A1 | 8/2010 | Mcmurray et al. | |
| 2010/0235273 A1 | 9/2010 | Friesen et al. | |
| 2010/0268634 A1* | 10/2010 | Mackey, Jr. | G06Q 40/04 |
| | | | 705/37 |
| 2010/0293110 A1 | 11/2010 | Rosenthal | |
| 2010/0318458 A1 | 12/2010 | West | |
| 2011/0040669 A1 | 2/2011 | Lee et al. | |
| 2011/0161222 A1 | 6/2011 | Shapiro et al. | |
| 2011/0251940 A1* | 10/2011 | Heaton | G06Q 40/04 |
| | | | 715/810 |
| 2011/0258036 A1 | 10/2011 | Ioffe et al. | |
| 2011/0264579 A1 | 10/2011 | Kline et al. | |
| 2012/0047060 A1 | 2/2012 | Fossler | |
| 2012/0084190 A1 | 4/2012 | Messina et al. | |
| 2012/0150713 A1 | 6/2012 | Russel et al. | |
| 2012/0317053 A1* | 12/2012 | Gartland | G06Q 40/04 |
| | | | 705/37 |
| 2013/0054439 A1 | 2/2013 | Zhao et al. | |
| 2013/0060671 A1 | 3/2013 | Lawrence | |
| 2013/0097664 A1 | 4/2013 | Herz | |
| 2013/0117198 A1 | 5/2013 | Hogan | |
| 2013/0297474 A1* | 11/2013 | Creamer | G06T 19/20 |
| | | | 705/37 |
| 2013/0317961 A1 | 11/2013 | Malatesta | |
| 2014/0095365 A1 | 4/2014 | Potekhina et al. | |
| 2014/0201055 A1* | 7/2014 | Shalen | G06Q 40/04 |
| | | | 705/37 |
| 2014/0279344 A1 | 9/2014 | Creamer et al. | |
| 2014/0279345 A1 | 9/2014 | Burns et al. | |
| 2014/0344186 A1 | 11/2014 | Nadler | |
| 2015/0081505 A1 | 3/2015 | Co et al. | |
| 2016/0063623 A1 | 3/2016 | Rooney et al. | |
| 2016/0132966 A1 | 5/2016 | Creamer | |
| 2016/0350855 A1 | 12/2016 | Lerner | |
| 2017/0236204 A1 | 8/2017 | Creamer et al. | |
| 2019/0121338 A1 | 4/2019 | Celia | |
| 2019/0172144 A1 | 6/2019 | Creamer | |
| 2019/0205982 A1 | 7/2019 | Creamer et al. | |
| 2019/0324444 A1 | 10/2019 | Celia | |
| 2020/0151815 A1 | 5/2020 | Whitfield | |
| 2020/0364790 A1 | 11/2020 | Creamer et al. | |
| 2021/0182882 A1 | 6/2021 | Mitchell | |
| 2021/0357772 A1 | 11/2021 | Egorov | |
| 2022/0237702 A1 | 7/2022 | Creamer | |

FOREIGN PATENT DOCUMENTS

| | | | | |
|---|---|---|---|---|
| GB | 2395819 A * | 6/2004 | | G06Q 40/04 |
| WO | 2007011517 | 7/2007 | | |
| WO | WO-2009070811 A1 * | 6/2009 | | G06Q 40/04 |

OTHER PUBLICATIONS

Sorenson, Eugene, and Richard Brath. "Financial visualization case study: Correlating financial timeseries and discrete events to support investment decisions." In 2013 17th International Conference on Information Visualisation, pp. 232-238. IEEE, 2013.

White, Ron. "How Computers Work, 9th Edition," Que, Indianapolis, IN, published Nov. 14, 2007, 465 pages.

Nousi et al., "Machine learning for forecasting mid-price movements using limit order book data," IEEE Access 7, 2019: 64722-64735.

Ta et a;., "Prediction and portfolio optimization in quantitative trading using machine learning techniques," Proceedings of the Ninth International Symposium on Information and Communication Technology, 2018.

Roberts, Pasha., "Information visualization of the stock market ticks: toward a new trading interface," Diss Massachusetts Institute of Technology, 2003.

Sastry, Lakshmi., "User interface managment systems for engineering applications," Computer graphics forum vol. 11., No. 2., Edinburgh, UK, Blackwell Science Ltd., 1992.

Hochheiser et al., "Dynamic query tools for time series data sets: timebox widgets for interactive exploration," Information Visualization 3.1, 2004, 1-18.

* cited by examiner

METHODS, APPARATUS, AND SYSTEMS TO FACILITATE TRADES USING DISPLAYED FINANCIAL CURVES

CROSS-REFERENCES TO RELATED APPLICATIONS

This application is a continuation of U.S. patent application Ser. No. 17/720,960, filed Apr. 14, 2022, entitled METHODS, APPARATUS, AND SYSTEMS TO FACILI-TATE TRADES USING DISPLAYED FINANCIAL CURVES, which is a continuation of U.S. patent application Ser. No. 17/160,180, filed Jan. 27, 2021, entitled METH-ODS, APPARATUS AND SYSTEMS FOR CURVE TRAD-ING, now U.S. Pat. No. 11,308,560, which is a continuation of U.S. patent application Ser. No. 16/273,084, filed Feb. 11, 2019, entitled METHODS, APPARATUS AND SYSTEMS FOR CURVE TRADING, now U.S. Pat. No. 10,909,626, which is a divisional of U.S. patent application Ser. No. 14/537,804 filed Nov. 10, 2014, entitled METHODS, APPA-RATUS, AND SYSTEMS FOR CURVE TRADING, now U.S. Pat. No. 10,204,379, the entirety of all applications are hereby incorporated by reference herein for all purposes.

BACKGROUND

A financial market (a "market") is a mechanism that allows people (e.g., traders) and entities to buy and sell (i.e., trade) financial securities (e.g., stocks and bonds), commodi-ties (e.g., precious metals or agricultural goods), contracts (i.e., a futures contract, such as stock index future), and other fungible items of value (hereinafter "securities" or "financial instruments") at prices that reflect supply and demand. Markets work by placing many interested buyers and sellers in one "place" (e.g., an actual or electronic marketplace), thus making it easier for market participants to find each other. A trader is a market participant who buys and sells financial instruments such as stocks, bonds, futures, com-modities, options, currencies, swaps, and other financial instruments or derivatives thereof. Trading is the purchase and sale of financial instruments with the intention of profiting from a change in price. Unlike an investor who buys financial instruments with the goal of selling them after an appreciation in price (usually over the course of a year or more), a trader can make money when the instrument goes up or down in value, and does so over a considerably shorter period of time than an investor.

Traders commonly use real-time, raw market data sup-plied by market exchanges rather than using delayed (such delays ranging from seconds to minutes, depending on exchange rules) market data that is available for free. In addition to the real-time, raw market data, some traders purchase more advanced data feeds that include historical data and features such as scanning large numbers of stocks in the live market for unusual activity. Market data typically contains information useful in showing recent market trans-actions and marketplace activities. For example, a market instrument, such as an energy futures contract, may have an ask price and one or more bid prices to purchase that instrument. A bid price is the highest price that a buyer (i.e., bidder) is willing to pay for an instrument. It is usually referred to simply as the "bid." The ask price, also called offer price, offer, asking price, or simply ask, is the price a seller states she or he will accept for an instrument. In bid and ask, the bid price stands in contrast to the ask price or "offer," and the difference between the two is called the bid/ask spread.

Traders generally reference different timelines or struc-tures (e.g., term structures) based on the market curve of a particular security (e.g., a debt instrument, such as Treasury debt). For example, a curve trader can follow a yield curve (i.e., a visual representation of a security's yield, such as an interest rate) over a period of time (i.e., a borrowing period, term, or time to maturity, hereinafter referred to as "matu-rity"). Each maturity of debt, e.g., a U.S. Treasury bond, is associated with a respective futures contract. U.S. Treasury debt yield curves (e.g., for a U.S. Treasury bond, such as T-bills and T-notes) compare the yield (via, i.e., the y-axis) to one or more respective three-month, year, five-year, and 30-year maturities (via, i.e., the x-axis). A yield curve can be displayed on, for example, an x-axis that denotes a security's maturity, such as a 1-year, 2-year, 5-year, 10-year, or 20-year maturity and a y-axis that denotes the security's yield.

The yield curve structure allows hedgers (e.g., banks and mortgage companies) and traders (collectively both referred to herein as "traders") to hedge and speculate on the move-ment of interest rates to predict changes in economic output and growth. For example, a trader may believe that a 5-year yield will decrease relative to the 10-year yield. Both yields may increase or decrease in the absolute, but the trader believes that the 5-year yield will decrease faster or increase slower than the 10-year yield. In this example, the trader may buy one or more 5-year futures contracts (or the actual cash bonds) and sell one or more 10-year futures contracts (or cash bonds). The trader has now placed a yield curve trade.

A time spread curve is a visual representation of a series of contracts or spreads over a period of time (e.g., over the months and/or years that the contract is traded) that can be represented graphically (e.g., via a series of axes). For example, CME's crude oil futures trade based on monthly contracts between April 2014 and December 2022, June and December 2021, and June and December 2022. Each con-tract month has a distinct price based on the market's view of supply, demand, shipping costs, etc. This structure assists traders who desire to lock in a price for a delivery at a future date. Traders may trade a series of months or periods of time and create one or more spreads—for example, buying a June 2015 crude oil futures contract and selling a June 2016 crude oil futures contract, or even different product spreads, for example, June 2014 heating oil against June 2015 gas oil (and spreads of different products and different spread months, etc.).

BRIEF DESCRIPTION OF THE DRAWINGS

One or more embodiments of the present invention are illustrated by way of example and not limitation in the figures of the accompanying drawings, in which like refer-ences indicate similar elements.

DETAILED DESCRIPTION

Figure 1:
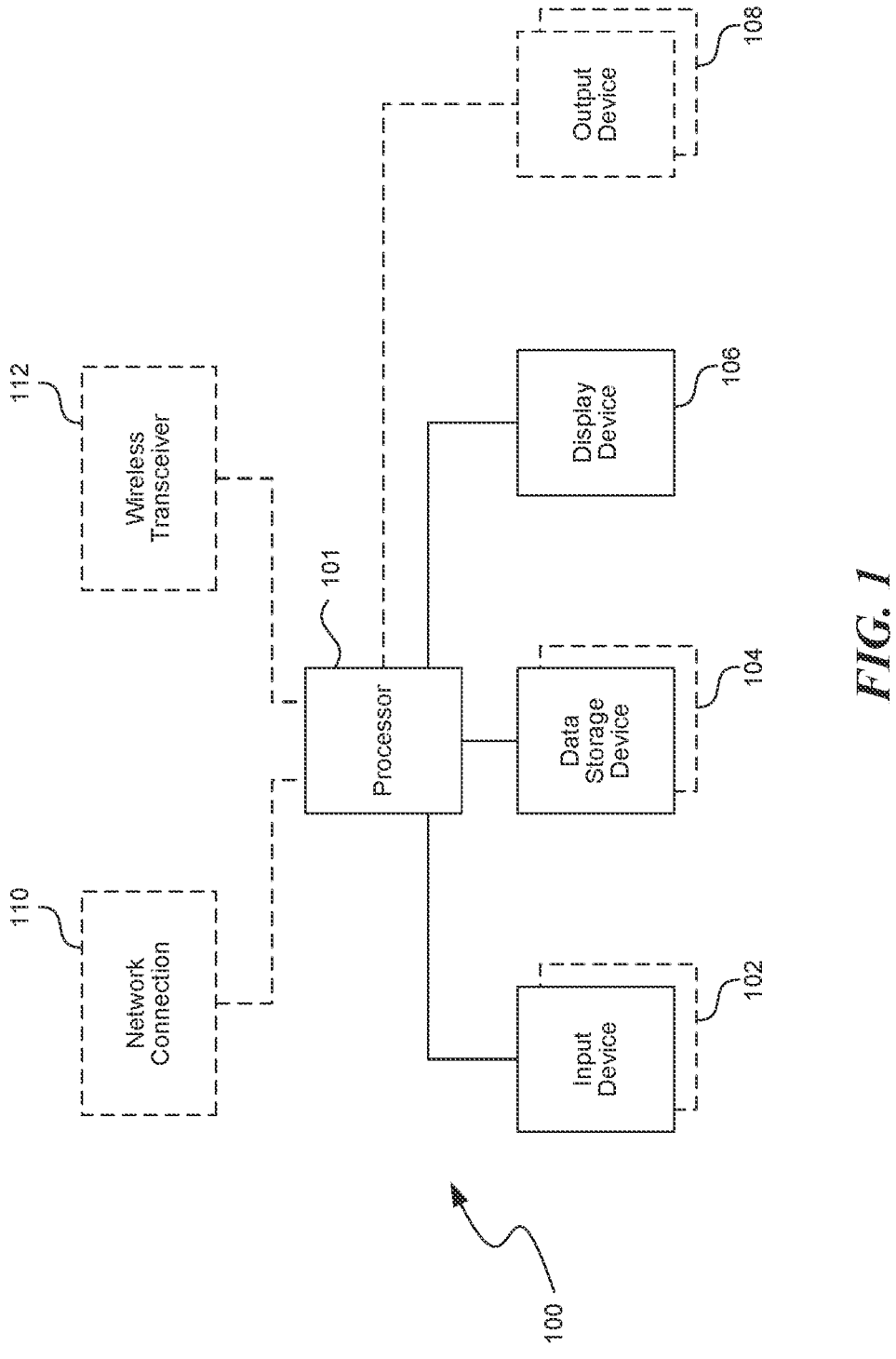
FIG. 1 is a block diagram of a basic and suitable computer that may employ aspects of the described technology.
Figure 2:
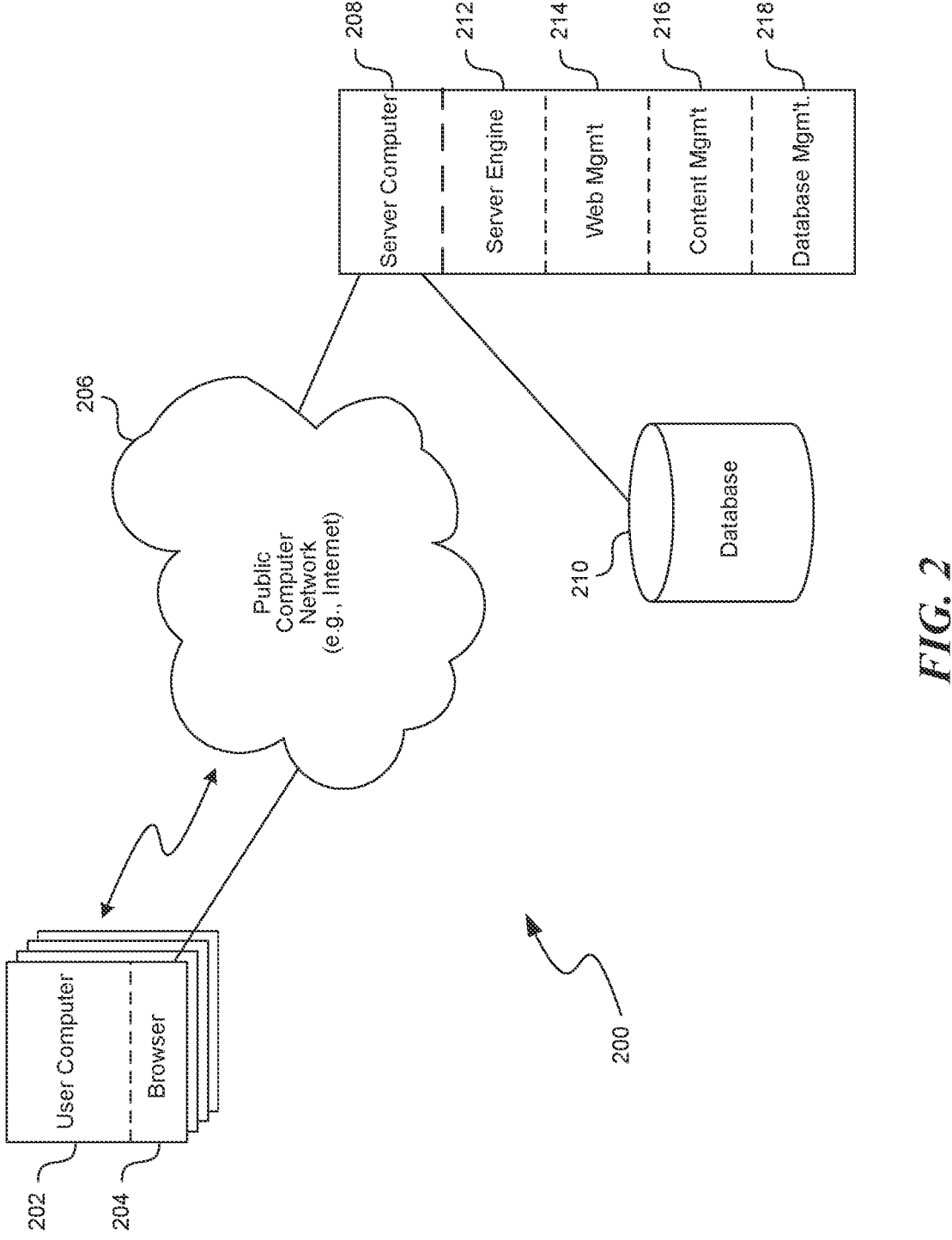
FIG. 2 is a block diagram illustrating a simple, yet suitable system in which aspects of the described technology may operate in a networked computer environment.

Introduced below are methods, devices, and systems (collectively herein referred to as "technology") for providing an interactive graphical user interface (GUI) that displays an actionable time series curve and/or an actionable yield curve (hereinafter collectively referred to as "curve" or "curves," unless otherwise described) to facilitate curve trading, based on a trader's direct interaction with one or more of the curves at the GUI.

A modern trader may use computer software to visualize time spread curves and yield curves to search for trends in the marketplace. The trader could previously view these markets as a series of dynamic prices for each price point via, for example, a grid format, or graphically on a chart with prices/yields plotted across a time series. Each price point represents a point in time where one or more contracts (e.g., a futures contracts), exchange traded products, synthetically generated products, or user defined combination of instruments (e.g., based on trading preferences and tolerances) can be traded. With the system described herein, as the market's valuation for a contract changes, a trader can view the price changes at various points along a curve as the curve moves or flexes (i.e., goes up or down on a grid or discrete points on the curve move up or down) based on current market valuation, and perform corresponding actions. Traders can study the shape of the curves because the shape can provide useful information of future interest rate change and economic activity, for example, economic growth, inflation, and recessions. A trader can then use the knowledge gained from reviewing the curves of these individual instruments to make market trades as described below.

The described technology, in general, provides a GUI trading platform for use by a trader to view and perform actions on financial curves (e.g., yield curves, time series curves, and/or curves on commodities or other products). In some embodiments, the described technology displays, at a GUI, a graph of one or more financial curves having actionable indicators indicative of tradable events (e.g., tradeable or actionable points within the GUI) associated with trading at least one market asset at a financial marketplace. The indicators can display an indicative value (e.g., price, user-derive price, currency adjusted price, yield, current real-time market value, delayed market value, historical value, etc.) of a tradable event associated with the market asset. Moreover, different financial instruments may have different indicative values or other information that can be displayed to a trader. The system receives input from a trader to perform an action associated with the financial curve (e.g., entering a value for a bid and/or ask price, creating a customized curve, linking tradable events or portfolios of products for creating and displaying a spread price, etc.). In response to receiving the input, the action is initiated and the results are displayed via the GUI.

In one or more embodiments, the described technology provides the ability to price and display an optimal curve, for example, by using native prices or custom pricing methodologies that allow traders to create simulated and/or real market orders. In accordance with various embodiments, the points on the curve may represent exchange traded products, synthetically generated products, or user-defined instruments. One or more curves may be overlaid on the GUI to, for example, allow a trader to better comprehend relationships and market dynamics. For example, a crude oil futures curve can be displayed on the same GUI as another crude oil futures curves and/or one or more heating oil curves. Displaying multiple curves concomitantly is useful for a trader to visualize relationships between multiple different market securities (e.g., futures contracts) as market valuations change.

In various embodiments, a curve is actionable in the sense that at each point in time where a contract can be traded in the market (herein referred to as a "trade event" or a "tradable event") as represented by respective graphic "trade event indicators" along the curve or multiple curves, the technology can perform a trade-related action (hereinafter referred to as an "action"), such as, automatically generating bid and/or ask prices, one or more trades, one or more spreads, data to pre-load into a local and/or remote auto-spreader, and/or parameters (e.g., variables of an algorithm used by the described technology to initiate a trade at a local and/or remote automated trading system); setting, initiating, and/or triggering alarms; generating and exporting financial data for facilitating a trade at a separate trading platform; causing a trade to be generated; and/or initiating a feature, algorithm, flow, order, display, data input/export, and/or other aspect of the described technology, such as one or more steps that a trader can perform at a financial marketplace. An example of a tradable event along a 2014 crude oil curve (e.g., a 2014 CME crude oil curve) is, for example, the ability of a trader to place a market order to trade a May 2014 CME crude oil futures contract and/or trade a July 2021 CME crude oil futures contract. An action for each of these tradable events could be selecting the respective trade event indicator on the GUI to, for example, model, trade and/or facilitation trading one or more of the respective May 2014 and July 2021 futures contract and/or creating one or more spreads.

A trade event indicator is, in various embodiments, a graphic (e.g., a square, circle, rectangle, triangle, line, dots, symbol, and/or other displayable graphic or text) that represents a tradable event displayed at a location (i.e., at a position on a screen or grid) approximate to that tradable event on the curve. The trade event indicator (e.g., the circle), in some embodiments, is configured to dynamically display the real-time market value corresponding to the tradable event (e.g., a trade event indicator in the shape of a circle can dynamically and automatically display the real-time market valuation of a July 2021 CME crude oil future contract (i.e., a tradable event)). The trade event indicator is displayed at a position such that a trader uses little eye movement to view the curve, the tradable event, and the trade event indicator. In some embodiments, the real-time market value corresponding to a tradable event is dynamically displayed "inside" the trade event indicator as the real-time market value flexes (i.e., point in curve goes up or down in response to change in price or value). Additionally or alternatively, one or more trade event indicators can display other indications to emphasize features of the described technology, such as displaying colors (e.g., green, yellow, or red) to signal changes to market value associated with a tradable event.

In accordance with various embodiments, a trader may be able to lock any single event indicator. By locking one of the event indicators presented on the GUI, the other indicators flex or change position as the relative price/net change of an indicator moves from the locked indicator. In addition, when multiple curves are presented on the GUI, a user may lock one or more of the curves. As a result, the other curves presented on the GUI may update (or flex) based on relative price/net change of the indicators on the curves. Similarly, various embodiments allow the trader to combine (or link) multiple event indicators. The multiple event indicators may be from multiple products. In response to the selection by the user, this linking can be illustrated on the GUI and result in a shape being formed (e.g., by the linking of the indicators). From this linking, the GUI can display relative price/net change movements.

Initiating actions and strategies can be performed automatically by the described technology and/or based on input received from a trader (e.g., by selecting a graphic on the GUI to make a trade). Actions, in some embodiments, are initiated or caused to be initiated based on the occurrence of an event, such as the time of the tradable event (i.e., when the marketplace is allowed to trade a contract, such as trading a Treasury security), a change in a contract's price, etc. In various embodiments, the described technology is configured to dynamically generate and/or initiate one or more actions (e.g., the creation of a price spread) by linking together tradable events (e.g., via their respective trade event indicators) on a single curve or between multiple curves. For example, a trader can link two tradable events to create a spread by selecting (e.g., by an input source) a first trade event indicator corresponding to a first tradable event (e.g., an option to buy a crude oil futures contract), then selecting (via an input source) a second trade event indicator corresponding to a second tradable event (e.g., a price of an option to sell a heating oil contract). A selected trade event can be dragged across the GUI to the other trade event indicator to automatically display a visual representation of the link (e.g., a line) between the trade event indicators. Additionally or alternatively, one or more keyboard commands (e.g., CTRL-L), mouse clicks, gestures, or other input sources can be used to link tradable events (e.g., to create a spread). For example, a trader can create a spread price to sell a 5-year Treasury yield and buy a 10-year Treasury yield by selecting (e.g., via a mouse) the respective trade event indicators and then pressing "CTRL-L" on a keyboard or making an "L" swipe gesture on the 5-year Treasury yield curve to a trade event indicator along the 10-year Treasury yield curve. The price of the new spread is automatically determined by the described technology based on real-time market data (i.e., the spread value is determined based on the difference between the sell price of the 5-year Treasury at a given time and the buy price of the 10-year Treasury curve at a given time) adjusted, if desired, by user-defined formulae or offsets.

In some embodiments, the described technology displays the price of a new spread within a spread indicator. Spread indicators are similar to trade event indicators in that spread indicators are one or more graphics (e.g., a square, circle, rectangle, triangle, line, dots, symbol, and/or other displayable graphic or text) that are configured to dynamically display the real-time price of the spread based on the real-time market valuation. In one or more embodiments, the spread indicator is displayed at a position on the GUI such that a trader uses little eye movement to simultaneously view the linked trade event indicators and the spread indicator; for example, in some embodiments, the spread indicator is on or approximately on a portion of the graphical indicator (e.g., the line) that visually connects the linked trade event indicators. Additionally or alternatively, one or more spread indicators can emphasize various features of the described technology by, for example, displaying colors (e.g., green, yellow, red) and other indicators to signal to a trader changes to market-related data, such as a new price of a tradable event.

In various embodiments, the described technology is configured to display a price difference (e.g., as a numerical value) between successive tradable events. For example, if a June 5-year Treasury futures contract has a market value of 98.59 and the next month's (i.e., July's) 5-year Treasury futures contract is 98.53, the described technology can display "–6" on the GUI, e.g., at a location between the June and July tradable events. In one or more embodiments, price differences are color-coded to provide the trader with a quick and comprehensive status of market changes between various tradable events along a curve.

In some embodiments, the described technology is programmed and/or programmable with one or more actions. For example, standard actions (e.g., buy, sell, create a spread price) may be preprogrammed into the described technology, and other actions (e.g., trader customizations or actions imported from other trading platforms) can be programmed into the described technology. For example, the trader can create a set of rules, macros or instructions beforehand that can be automatically executed following later input by the user.

In one or more embodiments, the described technology is used to create new or edit existing actions to develop multiple actions as part of a strategy. For example, based on the trader's own analytics, a trader can use the technology to create his/her own customized curve (e.g., a fair value curve) in a portion of the GUI. The trader can cause (e.g., by making a selection at the GUI) the described technology to move the customized curve to a section of the GUI such that the customized curve (e.g., the fair value crude oil curve) is overlaid other curves in the GUI (e.g., one or more market curves and/or other trader-generated curves). The trader can use his/her customized curves as a visual aid to compare the curve's prices to corresponding tradable events along a real market curve (e.g., one or more tradable events along a CME crude oil curve) and as a basis for creating actions (e.g., creating a spread). To increase or decrease prices along the trader's curve, a trader can select and move, via an input means and/or device (e.g., a mouse or touch via, e.g., a stylus or a finger, or a gesture) one or more points of a customized curve to a new position on the GUI. For example, if a trader believes that a sell price of a November crude oil contract (e.g., a tradable event) is valued lower than its market valuation, the trader can cause the technology to adjust a corresponding point along the customized curve to a position on the GUI that is above the November crude oil contract's market price, i.e., to indicate a price higher than the November crude oil contract's market price.

Some embodiments allow for the presentation and visualization of historical prices or other event data. For example, a trader may elect to have historical information presented from previous years. The historical information may be real-market pricing from one or more previous years that flexes with the current increments. As other examples, the historical prices or event data may include information regarding previous strategies, summaries or statistical information about market data, and the like. The visualization of the historical information of may be deemphasized on the GUI to create a ghosting type of effect. In some embodiments, the visualization may be created with specified stylistic patterns (e.g., color patterns, line styles, line weights, etc.) that different from the visualization used to present the current data. These types of visualization techniques allow the trader to easily distinguish between current and historical data. In addition, traders may be able to rewind or fast forward the historical data to match similar conditions.

In one example, the described technology implements a queue of multiple pending commands for an order. The queue acts like a "holding pen" for an action or batch of actions as part of a general strategy for accessing, creating, editing, and/or initiating multiple actions and strategies. A subset of the queue or the entire queue can be represented as an icon or indicator (e.g., a graphic) on the screen. The trader can interact with the holding pen to create and/or initiate the execution of one or more actions or a subset of the actions within the queue. Selecting the queue, or the subset of the queue, can be performed by an input, such as a gesture that moves the queue/subset to one or more trade indicators, spread indicators, curves, and/or prices, or by otherwise indicating a desire for the queue/subset to execute (e.g., selecting a prompt, inputting a voice command, etc.). Selecting the icon or indicator can automatically highlight the instruments on the curve that will be subject to the order execution, or in certain embodiments can also highlight existing positions or profit/loss in those instruments, or other user-defined information. Optionally, a separate confirmation may be required before the actions associated with the queue/subset are executed.

The queue of actions can be created and/or manipulated using various programmatic methods such as manually inputting commands into the described technology (e.g., via a mouse, touch or gesture) and/or moving local and/or remotely defined predefined objects into the queue. For example, a trader can select, various predefined objects imported from a separate trading platform into the holding pen. Each object has an associated command, e.g., "determine a spread price for X futures contract and Y futures contract" and various conditional statements (e.g., "if," "then," etc.). Using a touch screen or a mouse, for example, the trader can manipulate the position of the objects within the queue to reorder when and/or how a particular action will execute. Simple to complex strategies can be created in a queue, and multiple different queues can be created for various scenarios. Each queue can be associated with a customizable keyboard shortcut and/or gesture, such that when a keyboard shortcut and/or gesture is performed, the corresponding queue executes. Queues can be made on the fly, saved for later use, augmented, and/or shared between different trading platforms.

In one or more embodiments, in response to initiating an action (or strategy) and/or in response to a market update, the described technology automatically displays and/or updates (e.g., at one or more axes of a two-dimensional grid and/or a real or pseudo three-dimensional perspective, such as a topographical map, heat map, or surface chart) a trade event indicator to provide a trader a fast visualization of price changes along a curve as the curve flexes with the changes to the current market valuation.

The following description provides specific details for a thorough understanding and enabling description of these embodiments. One skilled in the art will understand, however, that the described technology may be practiced without many of these details. Additionally, some well-known structures or functions may not be shown or described in detail, so as to avoid unnecessarily obscuring the relevant description of the various embodiments.

Certain details are set forth in the following description and in FIGS. 1-6 to provide a thorough understanding of various embodiments of the disclosure. Other well-known structures and systems often associated with electronic trading systems have not been shown or described in detail below to avoid unnecessarily obscuring the descriptions of the various embodiments of the disclosure. Additionally, a person of ordinary skill in the relevant art will understand that the disclosure may have additional embodiments that may be practiced without several of the details described below. In other instances, those of ordinary skill in the relevant art will appreciate that the methods and systems described can include additional details without departing from the spirit or scope of the disclosed embodiments.

Many of the details, dimensions, functions and other features shown and described in conjunction with the Figures are merely illustrative of particular embodiments of the disclosure. Accordingly, other embodiments can have other details, dimensions, functions and features without departing from the spirit or scope of the present disclosure. In addition, those of ordinary skill in the art will appreciate that further embodiments of the disclosure can be practiced without several of the details described below.

The terminology used in the description presented below is intended to be interpreted in its broadest reasonable manner, even though it is being used in conjunction with a detailed description of certain specific embodiments of the technology. Certain terms may even be emphasized below; however, any terminology intended to be interpreted in any restricted manner will be overtly and specifically defined as such in this Detailed Description section.

The techniques introduced below can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

FIG. 1 and the following discussion provide a brief, general description of a suitable computing environment in which aspects of the described technology can be implemented. Although not required, aspects of the technology may be described herein in the general context of computer-executable instructions, such as routines executed by a general- or special-purpose data processing device (e.g., a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data related to the technology may be distributed over the Internet or over other networks (including wireless networks) on a propagated signal on a propagation medium (e.g., an electromagnetic wave, a sound wave, etc.) over a period of time. In some implementations, the data may be provided on any analog or digital network (packet switched, circuit switched, or other scheme).

The described technology can also be practiced in distributed computing environments where tasks or modules are performed by remote processing devices, which are linked through a communications network, such as a Local Area Network (LAN), Wide Area Network (WAN), or the Internet. In a distributed computing environment, program modules or subroutines may be located in both local and remote memory storage devices. Those skilled in the relevant art will recognize that portions of the described technology may reside on a server computer, while corresponding portions reside on a client computer (e.g., PC, mobile computer, tablet, or smart phone). Data structures and transmission of data particular to aspects of the technology are also encompassed within the scope of the described technology.

Referring to FIG. 1, the described technology employs a computer 100, such as a personal computer or workstation, having one or more processors 101 coupled to one or more user input devices 102 and data storage devices 104. The computer 100 is also coupled to at least one output device such as a display device 106 and one or more optional additional output devices 108 (e.g., printer, plotter, speakers, tactile or olfactory output devices, etc.). The computer 100 may be coupled to external computers, such as via an optional network connection 110, a wireless transceiver 112, or both.

The input devices 102 may include a keyboard, a pointing device such as a mouse, and technology for receiving human voice, touch, and/or sight (e.g., a microphone, a touch screen, and/or smart glasses). Other input devices are possible such as a joystick, pen, game pad, scanner, digital camera, video camera, and the like. The data storage devices 104 may include any type of computer-readable media that can store data accessible by the computer 100, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet (not shown in FIG. 1).

Aspects of the described technology may be practiced in a variety of other computing environments. For example, referring to FIG. 2, a distributed computing environment with a network interface includes one or more user computers 202 (e.g., mobile devices) in a system 200, each of which includes a graphical user interface (GUI) program component (e.g., a thin client component) 204 that permits the computer to access and exchange data, such as market data, with a network 206 such as a LAN or the Internet, including web sites, ftp sites, live feeds, and data repositories within a portion of the network 206. The user computers 202 may be substantially similar to the computer described above with respect to FIG. 1. The user computers 202 may be personal computers (PCs) or mobile devices, such as laptops, mobile phones, or tablets. The user computers 202 may connect to the network 206 wirelessly or through the use of a wired connection. Wireless connectivity may include any forms of wireless technology, such as a radio access technology used in wireless LANs or mobile standards such as 2G/3G/4G/LTE. The user computers 202 may include other program components, such as a filter component, an operating system, one or more application programs (e.g., word processing applications, spreadsheet applications, or Internet-enabled applications), and the like. The user computers 202 may be general-purpose devices that can be programmed to run various types of applications, or they may be single-purpose devices optimized or limited to a particular function or class of functions. More importantly, any application program for providing a graphical user interface to users may be employed, as described in detail below. For example, a mobile application or "app" has been contemplated, such as one used in Apple's® iPhone® or iPad® products, Microsoft® products, Nokia® products, or Android®-based products.

At least one server computer 208, coupled to the network 206, performs some or all of the functions for receiving, routing, and storing of electronic messages, such as market data, web pages, audio signals, and electronic images. While the Internet is shown, a private network, such as an intranet, may be preferred in some applications. The network may have a client-server architecture, in which a computer is dedicated to serving other client computers, or it may have other architectures, such as a peer-to-peer, in which one or more computers serve simultaneously as servers and clients. A database or databases 210, coupled to the server computer (s), store some content (e.g., market data) exchanged between the user computers; however, content may be stored in a flat or semi-structured file that is local to or remote of the server computer 208. The server computer(s), including the database(s), may employ security measures to inhibit malicious attacks on the system and to preserve the integrity of the messages and data stored therein (e.g., firewall systems, secure socket layers (SSL), password protection schemes, encryption, and the like).

The server computer 208 may include a server engine 212, a web management component 214, a content management component 216, and a database management component 218. The server engine 212 performs basic processing and operating system level tasks. The web management component 214 handles creation, streaming, or routing of market data. Users may access the server computer 208 by means of a network path associated therewith. The content management component 216 handles processes and technologies that support the collection, managing, and publishing of financial data and information, and other data. The database management component 218 includes storage and retrieval tasks with respect to the database, queries to the database, and storage of data. In some embodiments, multiple server computers 208 each having one or more of the components 212-218 may be utilized. In general, the user computer 202 receives data input by the user and transmits such input data to the server computer 208. The server computer 208 then queries the database 210, retrieves requested pages, performs computations and/or provides output data back to the user computer 202, typically for visual display to the user.

Figure 3:
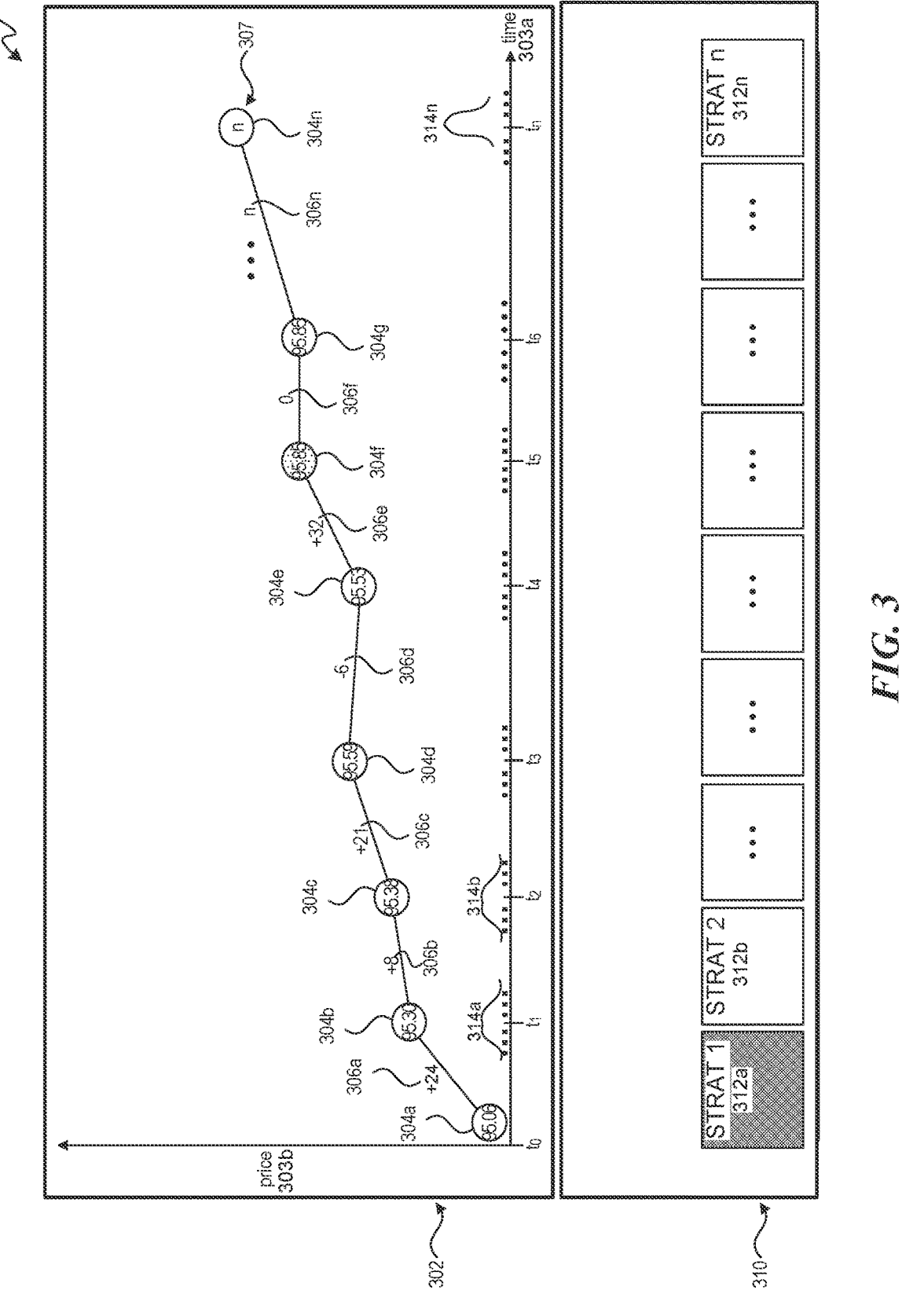
FIGS. 3-5 are examples of graphical user interfaces capable of implementing features of the described technol-ogy.

FIG. 3 is a graphical user interface (GUI) 300 capable of implementing features of the described technology. GUI 300 contains component blocks ("components") 302 and 310. Component 302 displays information, such as time series information 303-314 and/or yield information (not shown) (e.g., at one or more axes of a multidimensional grid, graph, chart, topographical map, or heat map, having a real or pseudo three-dimensional perspective) for displaying time series and/or yield curves. As a non-limiting example, component 302 displays time series information 303-314 on a two-dimensional graph (i.e., about a price axis 303$b$ and a time axis 303$a$ with time increments $t_1$-$t_n$) for displaying a time series curve ("curve") 307 (also generically referred to as a market curve 307). Market curve 307 includes and/or is associated with trade event indicators 304$a$-304$n$ and price difference values 306$a$-306$n$, as described below. While only one curve is illustrated in FIG. 3, various embodiments allow for multiple curves to be simultaneously presented to the trader. While market curve 307 illustrated in FIG. 3 has straight lines connecting adjacent trade event indicators, market curve 307 may be generated using a variety of interpolation techniques such as, but not limited to linear interpolation, cubic interpolation, spline interpolation, etc. In addition, the resulting curve may ultimately take many forms such as bending curves, smooth curves, zig-zag formations, parabolic curves, and other formations as the curve connects the trade event indicators 304$a$-304$n$.

Market curve 307 is a graphical representation of a financial asset's, e.g., a futures contract's, price at different times. Market curve 307 displays the real-time price of the represented financial asset in the market. The described technology, in various embodiments, dynamically updates (i.e., flexes up or down) the market curve 307 in response to changes of price for the financial asset. For example, if market curve 307 represents a CME oil futures contract that lost value at time $t_2$ (e.g., July 2014), the market curve 307 (i.e., the trade event indicator 304c, as described below) dynamically moves from its previous price (e.g., 95.38) to a new price along the price axis 303b. Other portions of the curves (i.e., other trade event indicators 304a-304n) can, in some embodiments, independently, simultaneously, and/or dynamically adjust on GUI 300 to reflect corresponding real-time market changes.

Trade event indicators 304a-304n, in one or more embodiments, are graphics (e.g., shapes, such as circles, squares, rectangles, points, etc.) displayed at respective times $t_1$-$t_n$ along market curve 307, where each time $t_1$-$t_n$ represents a time that an action (as described above, e.g., facilitating an order to buy, sell, or determining a spread price for a financial asset) can be performed in the market for the financial asset, for example, a crude oil and/or heating oil contract (and/or other financial asset) represented by market curve 307. Trade event indicators 304a-304n provide a trader an up-to-date, fast visualization of the real-time value of the financial asset and are each independently, simultaneously, and/or dynamically adjusted along market curve 307 and about GUI 300 to reflect real-time price changes in market.

In one or more embodiments, each trade event indicator 304a-304n dynamically displays, for example, within the graphic, the price of the real-time market value of the representative financial asset, for example, a futures contract, such as an oil or treasury contract. For example, if trade event indicator 304b is, for example, a circle, the real-time market value of the price of the representative asset (e.g., a futures contract) at that point in time (i.e., $t_1$) is dynamically displayed within or proximate to the circle. The dynamic display of the price within (or at a location proximate to) the trade event indicator (e.g., a circle) is, in various embodiments, combined with the flexing of the curve (as described above), such that as the real-time market changes, the curve flexing and price display occur substantially simultaneously. The combination of curve flexing and dynamic real-time display of pricing provide a trader multiple methods of visualizing a live market in a single GUI to aid the trader to quickly and efficiently understand market activity for making informed financial decisions.

Price difference values 306a-306n, in some embodiments, display the difference in price values between sequential tradable events 304a-304n. For example, the difference in value between 95.06, which is displayed at trade event indicator 304a, and 95.30, which is displayed at trade event indicator 304b, is 0.24, which can be expressed as a whole number (e.g., 24) and include an indicator (i.e., + or –) to indicate a price gain or a price loss (i.e., 24 is a price gain that can be expressed as +24 306a, and –6 306d is a loss in value between a tradable event at $t_3$ (i.e., trade event indicator 304d) and tradable event at $t_4$ (i.e., trade event indicator 304e)). Price difference values (i.e., +24 306a, +8 306b, +21 306c, –6 306d, +32 306e, 0 306f, and n 306n) provide to a trader a quick perspective of changes in market activity that affect sections of a curve (e.g., market curve 307).

Flex indicators 314a-314n, in one or more embodiments, are text or graphics (e.g., shapes, such as squares, circles, rectangles, points, etc.) displayed on each side of respective times $t_1$-$t_n$ along market curve 307 (i.e., a first section of 314a is depicted as small squares on the left side of t1 and a second section of 314a is depicted as small squares on the right of t1). Each flex indicator 314a-314n can be selected (e.g., via an input device) to perform one or more options.

For example, if the first section of flexible indicator 314a is selected, the technology can toggle the display of price difference value 306a (i.e., +24) at the GUI.

In some embodiments, flex indicators 314a-314n are movable about component 302 to, for example, affect a trade, set an alarm, display an indicator, and/or initiate an action. For example, if the second section of flexible indicator 314a (i.e., the three squares to the right of t2) is selected (e.g., via a mouse or finger) and dragged to the right, a new value (e.g., 95.42 (not shown)) corresponding to the trader event indicator 304c value 95.38 can be used as the basis of a visual (e.g., as a graphic indicator displayed at the GUI) and/or audible alarm. For example, the new value 95.42 can be the basis of an alarm such that if 95.38 increases to the new value 95.42, a visual and/or audible alarm can alert the trader to make a trade or perform an action. This can be useful because it allows the trader to multitask without missing important market activities.

Holding pen component 310 includes one or more graphics 312a-312n that represent an action (as described above) or combination of actions (i.e., a strategy) for trading and/or modeling a trade based on market curve 307. Strategies 312a-312n are, in some embodiments, programmed and/or programmable by a trader to create customized scenarios based on properties of market curve 307, such as changes to prices at various tradable events indicated by their respective trade event indicators 304a-304n. Some actions can include, for example, modeling, facilitating trading determining a spread price, and/or setting an alarm (e.g., visual and/or auditory) for a futures contract when its value reaches a certain price threshold. As further described below, an action can be, in one or more embodiments, calculating a spread price between multiple tradable events (i.e., via their respective indicators in the GUI 300). In some embodiments, one or more algorithms, actions, trade-related techniques, and/or strategies can be imported from other trading environments and displayed as one or more strategies 312a-312n that are actionable by a trader for performing at GUI 300. A trader can select one of more of the strategies 312a-312n based on an input device, such as a mouse, physical contact (e.g., finger, gesture, etc.), or other means.

In accordance with various embodiments, a trader may be able to lock any single trade event indicator 304a-304n. The position of the locked indicator is fixed within GUI 300 (e.g., the x position and the y position). For example, in some embodiments a trader may click on trade event indicator 304a which would become fixed in position on GUI 300. The other trade event indicators flex, or change position on the GUI, as the relative price/net change of an indicator moves from the locked indicator. The numerical representation of the real-time value of the financial asset presented in the trade event indicator will update, (e.g., change from 95.06 to 95.07). The position on the lock trade event indicator will not change. The other trade event indicators will only change position if there is a corresponding relative change. For example, if trade event indicator 304a was locked at 95.06 and then moved to 95.07, trade event indicator 304a would be updated with the new value but not move on GUI 300. If trade event indicator 304b moved to 95.31, then there would be no visual change (as the relative difference did not change) on GUI 300. If trade event indicator 304b moved to 95.32, then there would have been relative change causing the placement of trade event indicator 304b on GUI 300 to be updated.

In addition, when multiple curves are presented on GUI 300, a user may lock the position of one or more of the curves on GUI 300. As a result, the other curves presented on the GUI may update (or flex) based on relative price/net change of the indicators on the curves. Similarly, various embodiments allow the trader to combine (or link) multiple event indicators. The multiple event indicators may be from multiple products. In response to the selection by the user, this linking can be illustrated on GUI 300 and result in a shape being formed (e.g., by the linking of the indicators). From this linking, GUI 300 can display relative price/net change movements.

Figure 4:
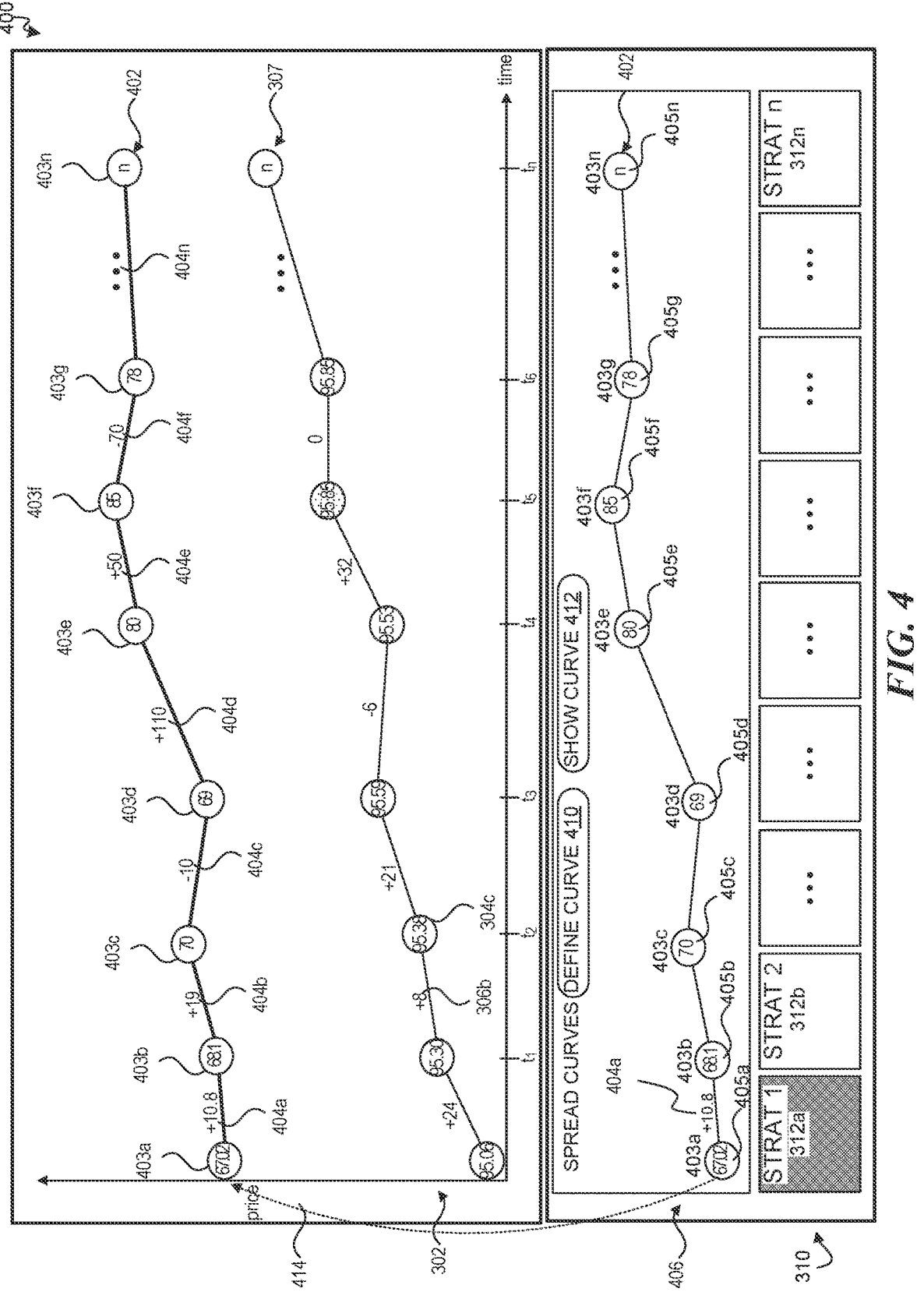

In some embodiments, the trader can also add additional vertical axes to GUI 300. These additional axes may be the reference to which the event indicator, curve, etc. is locked with respect to. In addition, while FIG. 3 illustrates a two-dimensional representation, other embodiments allow for a three-dimensional view. The three-dimensional view may be based on another analytic coupled to that point in time. Examples of the additional analytics include, but are not limited to, prices of correlated instruments, trading volumes, and the like. In some embodiments, additional information may be presented on the GUI. For example, the opening price in the market may be displayed. As another example, an indicator (e.g., an arrow) may be presented on the GUI to show movement since the opening of a selected, or marked, time FIG. 4 is a graphical user interface (GUI) 400 capable of implementing features of the described technology. GUI 400 is similar to GUI 300; for example, GUI 400 includes components 302 and 310. GUI 400 additionally includes component 406. Component 406 (hereinafter referred to as curve creator 406) contains technology for a trader to create a customized curve 402 based on the trader's own analytics. Curve creator 406 includes component 410 and component 412. Components 410 and 412, in some embodiments, are indicators (e.g., icons, text, and/or graphics, such as a button) that, when selected, provide an environment for a trader to define attributes (i.e., to define a curve via Define Curve indicator/button 410) of an existing and/or new curve (e.g., customized curve 402) and display the curve (i.e., via the Show Curve indicator/button 412) at component 302, respectively. For example, a trader can interact with the curve creator 406 to create a fair value curve (e.g., customized curve 402) to model the trader's expectations of how the market will value an actual market financial asset over time (e.g., a CME crude oil futures curve over the course of 2021). In various embodiments, a trader defines attributes of a customized curve 402 by selecting (e.g., via an input device, such as those described above) the Define Curve indicator 410. In various embodiments, curve creator 406 displays one or more trade event indicators 403a-403n for entering values (e.g., fair market prices) 405a-405n (e.g., the trader enters his/her fair market values based on his/her valuation of tradable events along the 2021 CME crude oil futures curve). Similar to price difference values 306a-306n, in some embodiments, price differences 404a-404n display the difference in price values between sequential tradable events 403a-403n (e.g., +10.8 404a is the difference in price between 68.1 displayed in trade event indicator 403b and 67.02 displayed in trade event indicator 403a) to provide a quick perspective of changes in market activity that affect sections of a curve (e.g., customized curve 402).

In one or more embodiments, values 405a-405n can be dynamically determined by manually manipulating respective trade event indicators 403a-403n. For example, using the described technology, a trader can drag (e.g., via an input device, such as those described above) a trade event indicator (e.g., trade event indicator 403b) up and/or down curve creator 406 to dynamically display a new price within the trade event indicator. For example, value "68.1" 405b of trade event indicator 403b can be increased to a new value (not shown) by moving (e.g., via a mouse, keyboard, or touch) trade event indicator 403b upwards.

In some embodiments, when the Show Curve indicator 412 is selected, a customized curve (i.e., customized curve 402) is displayed in component 406 such that the customized curve 402 is overlaid on the same graph as market curve 307 and/or other curves (not shown). As described above for FIG. 3, in one or more embodiments, one or more of the strategies 312a-312n are configured to define one or more actions for customized curve 402, e.g., creating alarms, creating spread prices, and forming trades. Actions are not limited to a single curve (e.g., customized curve 402); in various embodiments, actions can be based on multiple curves (e.g., customized curve 402 and market curve 307). For example, a trader can create a strategy 312a that, when initiated, causes the described technology to facilitate an order to buy a crude oil futures contract at a price 68.1 (e.g., as represented by trade event indicator event 403b) when the real-time price of a crude oil (e.g., as represented by trade event indicator 304c) moves from 95.38 to 97.01. As further described below, other actions (e.g., creating spread prices) are based on one or more aspects of multiple curves.

Figure 5:
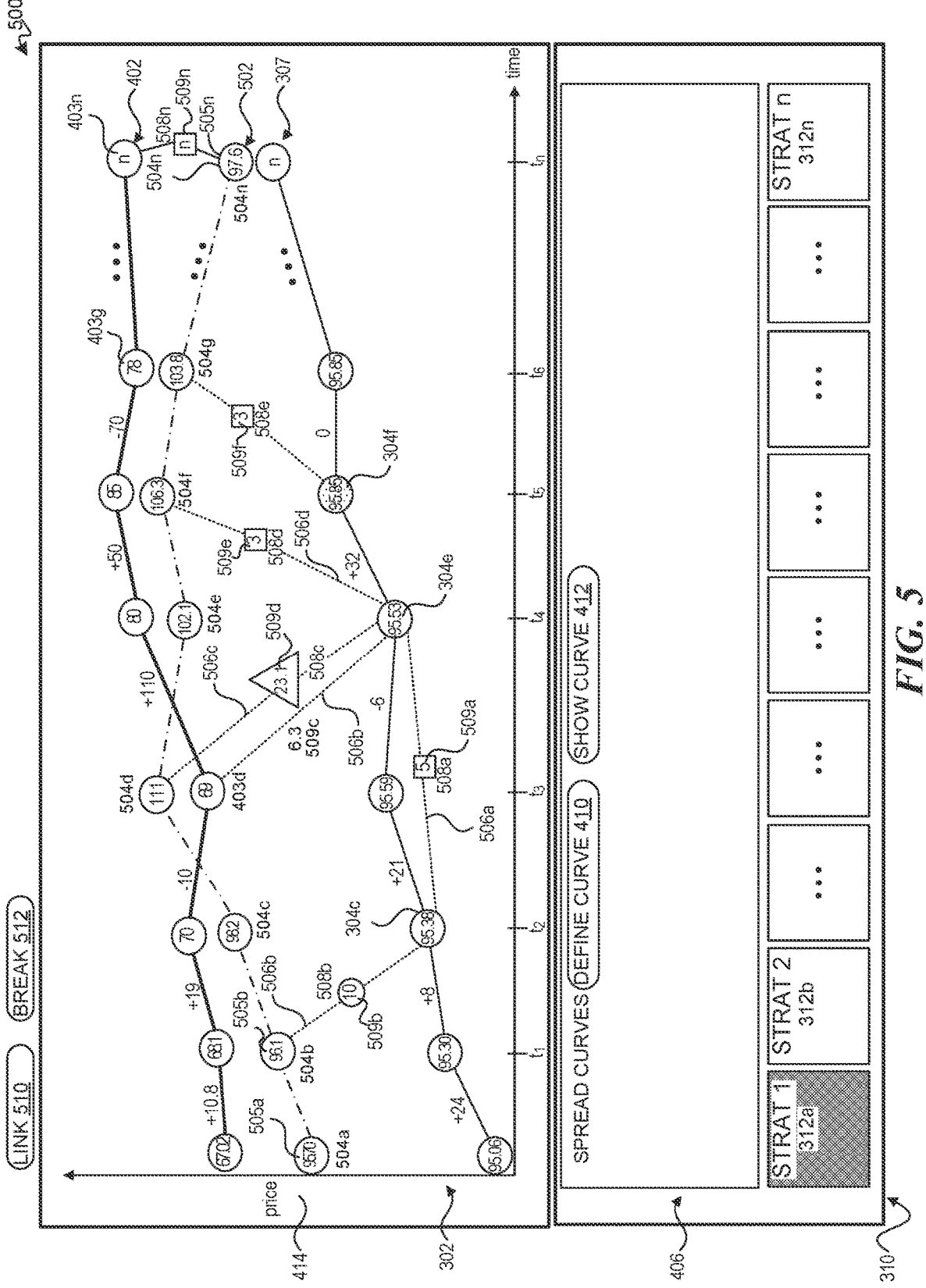

FIG. 5 is a graphical user interface (GUI) 500 capable of implementing features of the described technology. GUI 500 is similar to GUI 400; for example, GUI 500 includes market curve 307, customized curve 402, and components 302, 310, and 406. Component 302 additionally includes a second curve (e.g., a second market curve or a second customized curve) 502 and component 510 and component 512. As a non-limiting example, second curve 502 is hereinafter referred to as second market curve 502. Second market curve 502 is similar to market curve 307 and customized curve 402 in that second market curve 502 includes trade event indicators 504a-504n, each of which dynamically displays prices (e.g., spread prices 505a-505n), but typically all for different securities or instruments.

Component 510 (hereinafter referred to as Link component or button 510) and component 512 (hereinafter referred to as Break component or button 512), in some embodiments, are indicators (e.g., icons, text, and/or graphics, such as a button) that, when selected, provide technology for a trader to link tradable events (i.e., by selecting Link component 510) and break (i.e., disassociate) linked actions (i.e., by selecting Break component 512). For example, a trader can link multiple tradable events (i.e., via their respective trade event indicators 504a-504n) to create one or more actions based on the linked tradable events, such as generating a spread price 509a-509n based on the prices displayed within the respective linked trade event indicators 504a-504n. Spread prices 509a-509n are automatically and dynamically displayed based on the real-time value of the respective linked tradable events. For example, if an oil futures contract trade event is linked to a coal futures contract trade event, a spread price 509a-509n can be determined by the described technology based on the current market values of the futures contract.

As the market valuation of the futures contract changes, the spread prices are automatically updated. A line, dash, dots, or other visual link representation 506a-506n of linked tradable events, in some embodiments, is displayed in response to creating a link. For example, a trader can select two trade event indicators, for example, 304c and 304e, and select the Link component 510 (and/or other input means, such as a gesture), and the described technology will display a visual link representation 506a. In some embodiments, the trader may lock in the shape created by the links. In various embodiments, different sizes, colors, and other attributes can be configured to respond to one or more events (e.g., market valuation, a threshold bid/ask price being exceeded, etc.) so that the events will trigger a behavior of visual link representation 506a-506n behavior (e.g., flashing, dynamically changing colors, appearing to have movement, etc.).

In some embodiments, tradable events 504a-504n are linked between trade event indicators on a single curve (e.g., between trade event indicator 304c and trade event indicator 304e on market curve 307; between trade event indicator 504n on second market curve 502, and between trade event indicator 403n of customized curve 402), and in other embodiments tradable events 504a-504n are linked between different curves (e.g., between trade event indicator 304f on market curve 307 and trade event indicator 504g on second market curve 502). In some embodiments a single trade event indicator is linkable to multiple trade event indicators (e.g., trade event indicator 304e on market curve 307 is linked to trade event indicator 403d, 504d, and 504f). In response to the creation of a linked event, in various embodiments, a spread price (e.g., 509a) is determined by the described technology, e.g., based on the real-time market value (e.g., as dynamically displayed at the two selected trade event indicators (e.g., 304c and 304e)). In one or more embodiments, spread prices 505a-505n are dynamically displayed in (or in proximity to) spread price indicators 508a-508n, which are indicators similar to trade event indicators 304a-304n, 403a-403n, and/or 504a-504n and are displayed in a variety of shapes and sizes (i.e., square price indicators 508a, 508e, and 508n, circle price indicator 508b, and triangle price indicator 508c). However, in some embodiments a spread price (e.g., 6.3 509d) is not associated with a spread price indicator 508a-508n.

In various embodiments, the GUI may allow the linked trade event indicates to be presented in a second screen (not shown) or for the non-linked trade event indicators to be removed, hidden, or deemphasized. For example, the trader may create a gesture or keyboard combo (e.g., control 'a') to open a new screen with only the linked trade event indicators. This creates a clone of the linked trade event indicators. In some embodiments, a trade may select only a portion of the polygon created by the linked trade event indicators. For example, the trade may select, or grab, different points and pull them out to show fair value or generate a reversion. In accordance with some embodiments, these trade event indicators may be associated with instructions to buy or sell upon reaching a desired point. In some case, when a new window is opened the one or more trading strategies may be launched automatically. Event triggers from various services may also be used to trigger cloning of the linked event indicators in various embodiments.

Figure 6:
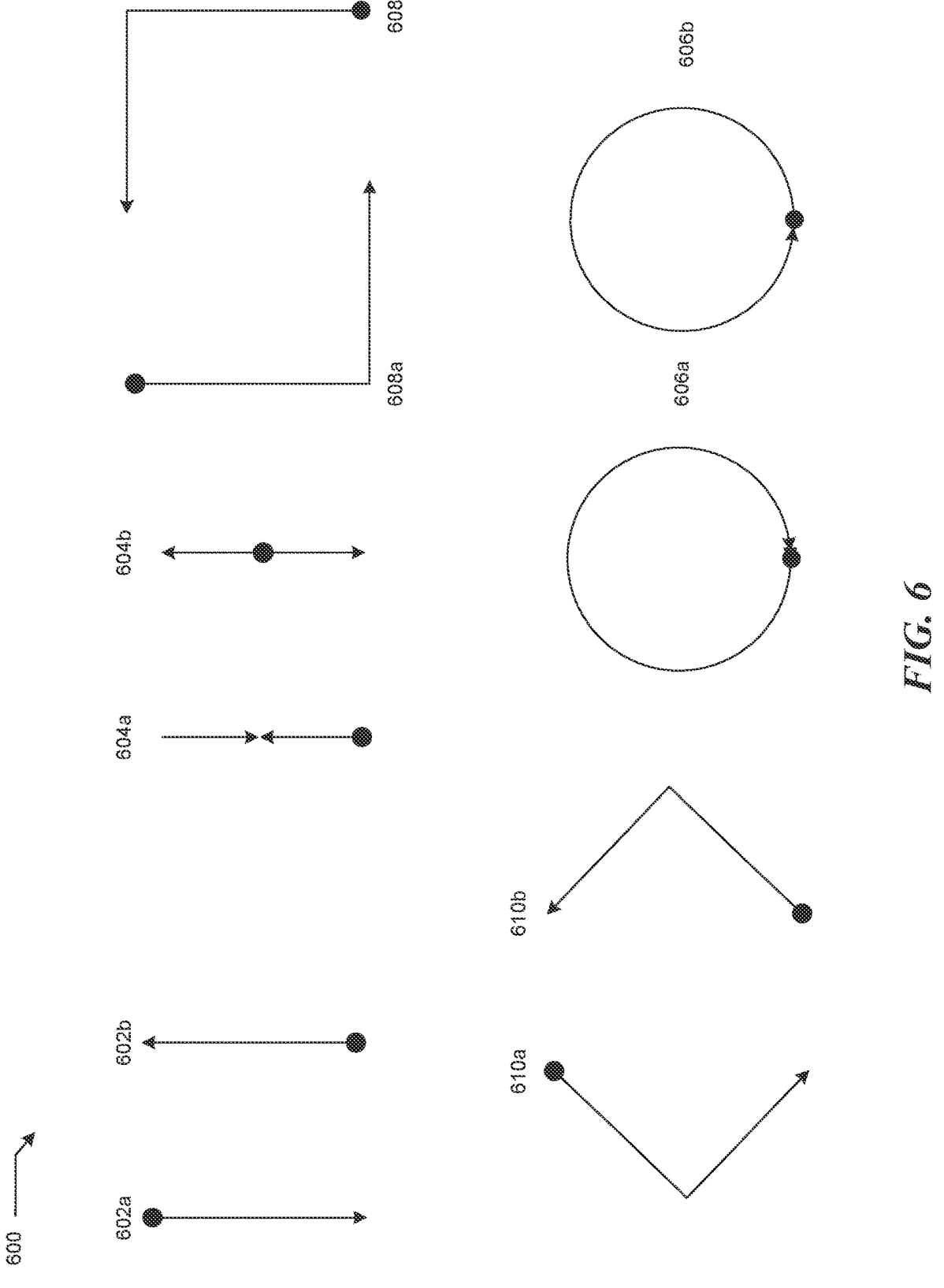
FIG. 6 depicts examples of various user gestures that can be used with various features of the described technology.

FIG. 6 depicts various user gestures 600 that can be used with various features of the described technology, such as use of the described technology with a touch screen device (e.g., a tablet computer). Gestures 602a and 602b are straight slide gestures that slide from top to bottom 602a and bottom to top 602b. Gestures 604a and 604b are a pinch-to-zoom gesture 604a and zoom-out gesture 604b, respectively. Gestures 606a and 606b are circular gestures in different directions. Gestures 608a and 608b are gestures that implement an "L" and "¬", respectively. Gestures 610a and 610b implement "<" and ">", respectively. Other gestures have been contemplated, such as using a combination of gestures simultaneously.

Any gesture 602a-610b, other gesture (not shown), or combination of gestures can be configured to interact with GUIs 300, 400, and 500. As described herein, gestures can be used for many aspects of the described technology to initiate various commands, such as moving and interacting with components 302, 310, and 406; curves 307, 402 and 502; trade event indicators 304a-304n, 403a-403n, and 504a-504n; and/or spread price indicators 508a-508n. In various embodiments, gestures can be used for entering values (e.g., prices), linking/breaking spreads; defining and showing curves; creating/editing strategies 312a-312n and customized curves 402; and/or zooming in and out of components 302, 310, and 406, etc. A gesture can be position-specific such that if it is made on one area of components 302, 310, and/or 406 a first command is generated or if made on another part of components 302, 310, and/or 406 a second command is generated, as described above. For example, gestures 608a and 608b when made in component 302 can be configured to automatically link or break tradable events, respectively; however, when gesture 608a is made in component 406, it may create a strategy (e.g., strategy 312b) to, for example, expert trading data to a separate trading platform when a different futures contract falls in value.

CONCLUSION

In general, the detailed description of embodiments of the described technology is not intended to be exhaustive or to limit the technology to the precise form disclosed above. While specific embodiments of, and examples for, the technology are described above for illustrative purposes, various equivalent modifications are possible within the scope of the described technology, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the described technology provided herein can be applied to other systems, not necessarily the system described herein. The elements and acts of the various embodiments described herein can be combined to provide further embodiments.

The techniques introduced above can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Software or firmware for implementing the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.).

The term "logic," as used herein, can include, for example, special-purpose hardwired circuitry, software and/or firmware in conjunction with programmable circuitry, or a combination thereof.

These and other changes can be made to the described technology in light of the above Detailed Description. While the above description details certain embodiments of the technology and describes the best mode contemplated, no matter how detailed the above appears in text, the described technology can be practiced in many ways. The described technology may vary considerably in its implementation details, while still being encompassed by the technology disclosed herein. As noted above, particular terminology used when describing certain features or aspects of the described technology should not be taken to imply that the terminology is being redefined herein to be restricted to any specific characteristics, features, or aspects of the technology with which that terminology is associated. In general, the terms used in the following claims should not be construed to limit the described technology to the specific embodiments disclosed in the specification, unless the above Detailed Description section explicitly defines such terms. Accordingly, the actual scope of the described technology encompasses not only the disclosed embodiments, but also all equivalent ways of practicing or implementing the described technology.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for," but use of the term "for" in any other context is not intended to invoke treatment under 35 U.S.C. § 112, ¶6.) Accordingly, the applicant reserves the right to pursue additional claims after filing this application to pursue such additional claim forms, in either this application or in a continuing application.

I claim:

1. At least one computer-readable medium, excluding transitory signals, carrying instructions that, when executed by a computing system, cause the computing system to:

cause display, at a graphical user interface (GUI), of a financial curve comprising a set of indicators, each indicative of a tradable event associated with trading at least one financial instrument, wherein each indicator in the set of indicators is associated with a real-time market value of a respective tradable event associated with the at least one financial instrument;

wherein the financial curve includes relative prices between two or more indicators of the set of indicators;

receive a selection of a subset of indicators to generate a linked item based on the subset of indicators;

in response to the received selection, cause performance of at least one action configured to:

create a linked item based on respective real-time market values of the subset of indicators, and generate a visual representation of the linked item; and automatically and dynamically update the linked item and the visual representation, wherein updating the visual representation includes dynamically changing a visual attribute of the visual representation displayed via the GUI, the visual attribute being caused to dynamically change at least one of color, shape, or position;

receive a selection of any indicator of the set of indicators to lock the position of the selected indicator in the GUI;

in response to the received selection, lock the selected indicator, wherein unlocked indicators in the financial curve flex or change position as the relative price of the unlocked indicators move from the locked indicator.

2. The at least one computer-readable medium of claim 1, wherein the linked item relates to a metric that comprises one of a spread price, a currency adjusted price, a yield, and a current real-time market value, delayed market value.

3. The at least one computer-readable medium of claim 1, wherein the subset of indicators to be linked include a first indicator included in the financial curve and one or more second indicators included in a different financial curve.

4. The at least one computer-readable medium of claim 1, wherein the visual representation indicates a relationship between one or more real-time market values of the subset of indicators, and wherein the at least one action includes causing the GUI to display the visual representation between the subset of indicators.

5. The at least one computer-readable medium of claim 1, wherein the computing system is further caused to:

deemphasize or remove at least one indicator not in the subset of indicators from the GUI.

6. The at least one computer-readable medium of claim 1, wherein the computing system is further caused to:

cause display of a user-defined fair value curve in the GUI comprising multiple indicators each indicative of an expected value of a financial instrument over time, wherein the user-defined fair value curve is overlaid on the displayed financial curve, and wherein the user-defined fair value curve includes differences in price values between sequential tradable events associated with the multiple indicators.

7. A computing system, comprising:

at least one hardware processor; and at least one non-transitory memory carrying instructions that, when executed by the computing system, cause the computing system to:

cause display, at a graphical user interface (GUI), of a financial curve comprising a set of indicators, each indicative of a tradable event associated with trading at least one financial instrument, wherein each indicator in the set of indicators is associated with a real-time market value of a respective tradable event associated with the at least one financial instrument;

wherein the financial curve includes relative prices between two or more indicators of the set of indicators;

receive a selection of a subset of indicators to generate a linked item based on the subset of indicators;

in response to the received selection, cause performance of at least one action configured to:

create a linked item based on respective real-time market values of the subset of indicators, and generate a visual representation of the linked item; and automatically and dynamically update the linked item, wherein updating the visual representation includes dynamically changing a visual attribute of the visual representation displayed via the GUI, the visual attribute being caused to dynamically change at least one of color, shape, or position;

receive a selection of any indicator of the set of indicators to lock the position of the selected indicator in the GUI;

in response to the received selection, lock the selected indicator, wherein unlocked indicators in the financial curve flex or change position as the relative price of the unlocked indicators move from the locked indicator.

8. The computing system of claim 7, wherein the linked item relates to a metric that comprises one of a spread price, a currency adjusted price, a yield, and a current real-time market value, delayed market value.

9. The computing system of claim 7, wherein the subset of indicators to be linked include a first indicator included in the financial curve and one or more second indicators included in a different financial curve.

10. The computing system of claim 7, wherein the computing system is further caused to:

perform a trade-related action, comprising one of generating a bid price, generating an ask price, generating a trade, initiating an alarm relating to the financial curve, and executing a trade.

11. The computing system of claim 7, wherein the visual representation indicates a relationship between one or more real-time market values of the subset of indicators, and wherein the at least one action includes causing the GUI to display the visual representation between the subset of indicators.

12. The computing system of claim 7, wherein the computing system is further caused to:

cause display of a user-defined fair value curve in the GUI comprising multiple indicators each indicative of an expected value of a financial instrument over time, wherein the user-defined fair value curve is overlaid on the displayed financial curve, and wherein the user-defined fair value curve includes differences in price values between sequential tradable events associated with the multiple indicators.

13. A method performed by at least one computing system to create a linked value based on real-time market values associated with graphical indicators in one or more financial curves, the method comprising:

cause display, at a graphical user interface (GUI), of a financial curve comprising a set of indicators, each indicative of a tradable event associated with trading at least one financial instrument, wherein each indicator in the set of indicators is associated with a real-time market value of a respective tradable event associated with the at least one financial instrument;

wherein the financial curve includes relative prices between two or more indicators of the set of indicators;

receive a selection of a subset of indicators to generate a linked item based on the subset of indicators;

in response to the received selection, cause performance of at least one action configured to:

create a linked item based on respective real-time market values of the subset of indicators, and generate a visual representation of the linked item; and automatically and dynamically update the linked item and the visual representation, wherein updating the visual representation includes dynamically changing a visual attribute of the visual representation displayed via the GUI, the visual attribute being caused to dynamically change at least one of color, shape, or position;

receive a selection of any indicator of the set of indicators to lock the position of the selected indicator in the GUI;

in response to the received selection, lock the selected indicator, wherein unlocked indicators in the financial curve flex or change position as the relative price of the unlocked indicators move from the locked indicator.

14. The method of claim 13, wherein the linked item relates to a metric that comprises one of a spread price, a currency adjusted price, a yield, and a current real-time market value, delayed market value.

15. The method of claim 13, wherein the subset of indicators to be linked include a first indicator included in the financial curve and one or more second indicators included in a different financial curve.

16. The method of claim 13, further comprising:

perform a trade-related action, comprising one of generating a bid price, generating an ask price, generating a trade, initiating an alarm relating to the financial curve, and executing a trade.

17. The method of claim 13, wherein:

the visual representation indicates a relationship between one or more real-time market values of the subset of indicators, and wherein the at least one action includes causing the GUI to display the visual representation between the subset of indicators.

18. The method of claim 13, further comprising:

causing display of a user-defined fair value curve in the GUI comprising multiple indicators each indicative of an expected value of a financial instrument over time, wherein the user-defined fair value curve is overlaid on the displayed financial curve, and wherein the user-defined fair value curve includes differences in price values between sequential tradable events associated with the multiple indicators.

* * * * *